United States Patent [19]

Itoh et al.

[11] 4,306,164
[45] Dec. 15, 1981

[54] PULSE MOTOR

[75] Inventors: Hisayasu Itoh, Yokohama; Hiroshi Sakai, Sagamihara; Rokuro Homma; Munetada Kazama, both of Tokyo, all of Japan

[73] Assignees: Oki Electric Industry Co. Ltd.; Nippon Telegraph and Telephone Public Corporation, both of Tokyo, Japan

[21] Appl. No.: 969,376

[22] Filed: Dec. 14, 1978

[30] Foreign Application Priority Data

Dec. 19, 1977 [JP] Japan ............................ 52/151684

[51] Int. Cl.$^3$ ............................................ H02K 37/00
[52] U.S. Cl. ............................ 310/49 R; 310/156; 310/112
[58] Field of Search ............... 310/49, 156, 112, 114, 310/126

[56] References Cited

U.S. PATENT DOCUMENTS

| 3,089,069 | 5/1963 | Thomas | 310/49 X |
| 3,401,322 | 9/1968 | O'Regan | 310/49 |
| 3,411,059 | 11/1968 | Kaiwa | 310/49 X |
| 4,070,592 | 1/1978 | Snowdon et al. | 310/49 |
| 4,127,802 | 11/1978 | Johnson | 310/49 X |

Primary Examiner—Donovan F. Duggan

Attorney, Agent, or Firm—Armstrong, Nikaido, Marmelstein & Kubovcik

[57] ABSTRACT

A pulse or stepping motor with a stator assembly and a rotor assembly has been found. The stator assembly comprises a cylindrical housing of ferromagnetic material, the first, second, third, and fourth ring shaped stators secured in said housing with some gaps between them, a pair of circular windings secured between the first and the third stators and between the second and the fourth stators respectively, the axis of said winding being identical or parallel to the axis of the pulse motor itself, each of said stators having a plurality of magnetic poles on the inner surface of the ring shaped structure, the angular duration of each magnetic pole of each stator being of uniform pitch. The rotor assembly is rotatably inserted in said stator assembly and comprises an axis, the first, second, third and fourth rotors each confronting the corresponding stators in said stator assembly, a cylindrical permanent magnet inserted between the second and third rotors so that the magnetic flux is generated in the axis direction, each rotor having a plurality of magnetic poles on the outer surface of the same, the number of magnetic poles on each rotor being the same as that on each stator, and each rotor being positioned so that the angular relationship of the magnetic poles of each rotor is staggered by ¼ pitch of the poles.

4 Claims, 16 Drawing Figures

PULSE MOTOR

BACKGROUND OF THE INVENTION

The present invention relates to a structure of a pulse motor, in particular, relates to a pulse motor in which a permanent magnet is mounted in a magnetic path.

First, a prior pulse motor is described in accordance with FIGS. 1,2A and 2B to facilitate understanding of the present invention. FIG. 1 is a cross sectional view of a prior pulse motor, FIG. 2A is a cross sectional view at the line A—A of FIG. 1, and FIG. 2B is a perspective view of the stator. In those figures, the reference numeral 1 is a stator assembly, and 2 is a stator. The stator 2 has a plurality of magnetic poles 3a–3h on the internal surface of the stator 2. Each magnetic poles 3a–3h has a winding 4a through 4h.

The reference numeral 12 is a rotor assembly, 13 is a first rotor, and 14 is a second rotor. 15 is a permanent magnet secured between the first rotor 13 and the second rotor 14. On the outer surface of the rotors 13 and 14, a plurality of magnetic poles 16 are provided. Each magnetic pole 16 runs parallel to the axis of the rotor assembly 12, and confronts the magnetic poles 3a through 3h on the stator assembly 2. The magnetic pole 16 of the second rotor 14 is positioned at a different angle from that of the first rotor 13 by half the pitch of the magnetic poles.

The operation of the pulse motor in FIGS. 1,2A and 2B is as follows. As apparent from FIG. 1, the first rotor 13 is magnetized as an N-pole, and the second rotor 14 is magnetized as an S-pole by the permanent magnet 15. Supposing that the stator magnetic poles 3d and 3h are magnetized as N-poles by flowing an electrical current in the windings 4d and 4h, and that the stator magnetic poles 3b and 3f are magnetized as S-poles by the electrical current in the windings 4b and 4f, the magnetic pole 16 on the second rotor 14 is attracted by the N-pole of the stator magnetic poles 3d and 3h, thus, the rotor assembly rotates so that the rotor magnetic poles of the second rotor confront the N-poles of the stator magnetic poles. Next, supposing that the stator magnetic poles 3c and 3g are magnetized as N-poles by the windings 4c and 4g, and that the stator magnetic poles 3a and 3e are magnetized as S-poles by the windings 4a and 4e, then the second rotor 14 has the rotor assembly rotate in the clock-wise direction in FIG. 2A. Further, supposing that the stator magnetic poles 3b and 3f are magnetized as N-poles by the windings 4b and 4f and that the stator magnetic poles 3d and 3h are magnetized as S-poles by the windings 4d and 4h, then the second rotor 14 continues to have the rotor assembly rotate in the clock-wise direction. Similarly, by shifting the N-pole and S-pole on the stator magnetic poles, the second rotor continues to have the rotor assembly rotate.

Similarly, the first rotor 13 has the rotor assembly rotate in the clock-wise direction. That is to say, as the first rotor 13 is magnetized as N-pole by the permanent magnet 15, the first rotor 13 has the rotor assembly rotate when the corresponding stator magnetic poles are magnetized as S-poles. As mentioned before, the rotor magnetic poles 16 of the first rotor 13 are positioned on the axis of the rotor assembly at half pitch angle from these of the second rotor 14, the first rotor and the second rotor apply the rotational power to the rotor assembly alternately.

However, the prior pulse motor disclosed in FIGS. 1 and 2 has the disadvantages as follows. First, the prior pulse motor has rectangular stator magnetic poles, and thus, the windings are rectangular. So, the coil-winding operation is very difficult. Further, eight windings are necessary, and it takes a long time to insert each coil in the spaces around the magnetic poles.

Further, since the structure of the stator windings is complicated, some portion of the windings becomes shortcircuited or suffer from a loss of insulation. In some case, each coil has 500 turns, and the diameter of the stator assembly is only 4 mm, so it should be appreciated that the coil-winding work is very difficult.

SUMMARY OF THE INVENTION

It is an object, therefore, of the present invention to overcome the disadvantages and limitations of a prior pulse motor by providing a new and improved pulse motor.

It is also an object of the present invention to provide a pulse motor of simple structure, in particular, having simple stator windings.

The above and other objects are attained by a pulse or stepping motor with a stator assembly and a rotor assembly. The stator assembly comprises a cylindrical housing of ferromagnetic material, the first, second, third, and fourth ring shaped stators secured in said housing with some gaps between them, a pair of circular windings secured between the first and the third stators and between the second and the fourth stators respectively, the axis of said winding being identical or parallel to the axis of the pulse motor itself, each of said stators having a plurality of magnetic poles on the inner surface of the ring shaped structure, the angular duration of each magnetic pole of each stator being of uniform pitch. The rotor assembly is rotatably inserted in said stator assembly and comprises an axis, the first, second, third and fourth rotors each confronting the corresponding stators in said stator assembly, a cylindrical permanent magnet inserted between the second and the third rotors so that the magnetic flux is generated in the axis direction, each rotor having a plurality of magnetic poles on the outer surface of the same, the number of magnetic poles on each rotor being the same as that on each stator, and each rotor being positioned so that the angular relationship of the magnetic poles of each rotors is staggered by ¼ pitch of the poles.

It should be appreciated that the present pulse motor has at least the following features;

(a) The number of windings is only two.

(b) The shape of the windings is circular, instead of rectangular as in a prior art.

(c) The windings are positioned in the stator assembly so that the axis of the windings is identical, or at least parallel, to the axis of the pulse motor itself. In another words, the windings are positioned in the plane perpendicular to the axis of the pulse motor. It should be noted that the axis of the windings in a prior art is perpendicular to the axis of the pulse motor.

(d) The stator assembly has four ring shaped stators, while a prior pulse motor has a single cylindrical stator.

(e) Each stator or rotor is positioned so that the angular relationship of each magnetic pole is staggered by ¼ pitch of the poles. The difference in a prior pulse motor is ½ pitch.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 3:
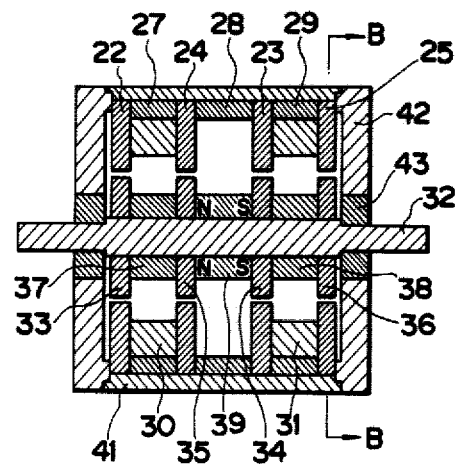
FIG. 3 is the cross sectional view of the pulse motor according to the present invention.
Figure 4A:
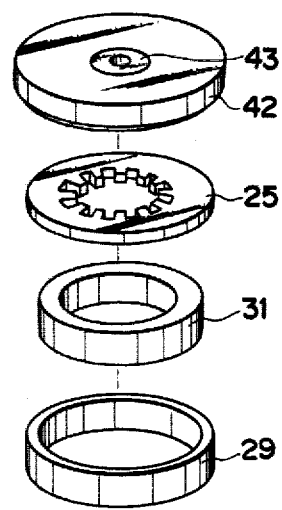
FIG. 4A is the cross sectional view at the line B—B of FIG. 3.
Figure 4B:
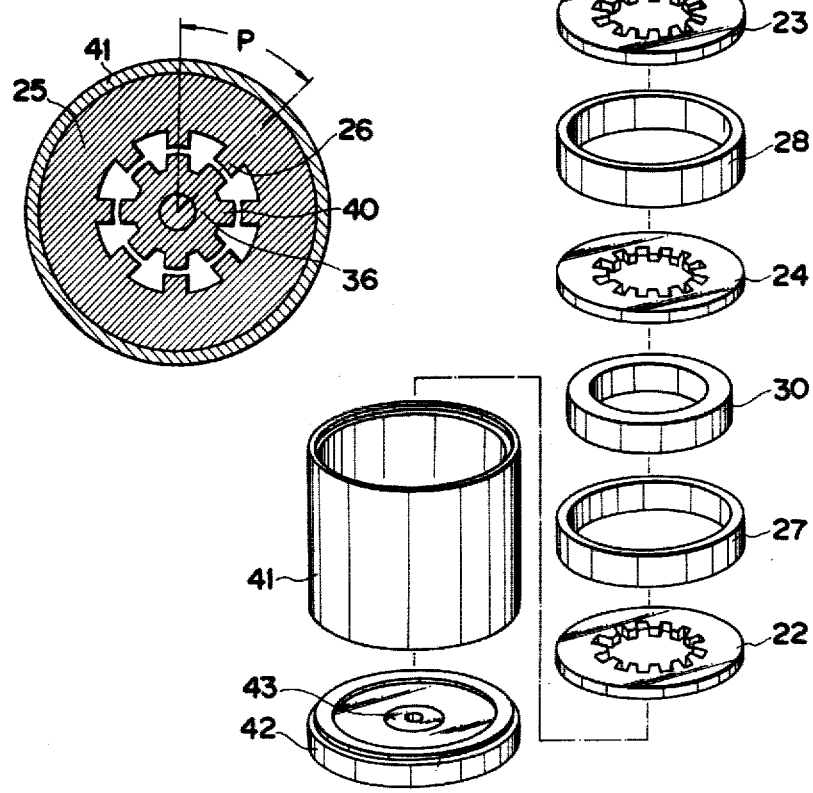
FIG. 4B is the assembly drawing of the pulse motor in FIG. 3, FIGS. 5 through 9 are the explanatory drawings for explanation of the operation of the pulse motor in FIG. 3.

FIG. 3 shows the cross sectional view of the embodiment of the pulse motor according to the present invention. FIG. 4A is the cross sectional view at the line B—B of FIG. 3 and FIG. 4B is the assembly drawing of the pulse motor of FIG. 3. FIGS. 5 through 9 are drawings for the explanation of the operation of the present pulse motor. In those figures, the reference numerals 22 through 25 and 27 through 31 compose a stator assembly. The reference numeral 22 is a first stator, 23 is a second stator, 24 is a third stator, 25 is a fourth stator. Those stators 22 through 25 are ring shaped and have a plurality of magnetic poles 26 at the internal surface of the ring. The reference numerals 27 through 29 are yokes composed of ferromagnetic material.

Figure 1:
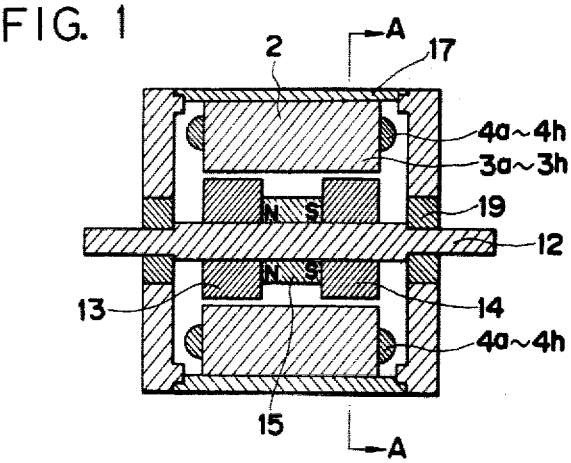
FIG. 1 is the cross sectional view of a prior pulse motor.
Figure 2A:
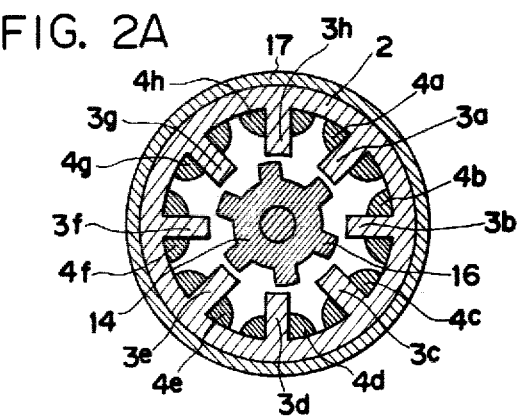
FIG. 2A is the cross sectional view at the line A—A of FIG. 1.
Figure 2B:
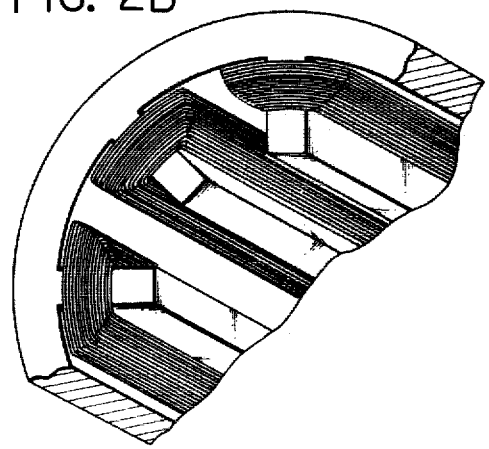
FIG. 2B is the perspective view of the magnetic poles of the stator assembly in FIG. 1.

The reference numeral 30 is a first winding, 31 is a second winding. Those windings are circular in shape, and the axis of those windings is identical or parallel to the axis of the pulse motor itself. It should be appreciated that the circular shape of the windings and the direction of the axis of the windings are the important features of the present invention. As apparent by comparison with the prior pulse motor, the prior pulse motor in FIGS. 1 and 2A and 2B has windings of rectangular shape, and the axis of the windings of the prior pulse motor is perpendicular to the rotor axis. The reference numerals 32 through 39 compose a rotor assembly, in which 32 is a rotor axis, 33 is a first rotor, 34 is a second rotor, 35 is a third rotor, 36 is a fourth rotor, 37 and 38 are yokes, and 39 is a permanent magnet. It is a matter of course that the rotors 33 through 36, yokes 37 and 38, and the permanent magnet 39 are rigidly fixed on the rotor axis 32.

A plurality of magnetic poles 40 are provided on the outer surface of each rotor 33 through 36 at an angular duration (p), and the number of teeth of the magnetic poles on each rotor is the same as that of each stator. Further, the magnetic poles of each rotor are staggered at the angle ¼ pitch in the revolutional direction in relationship to one another. The reference numeral 41 is a cylindrical housing, 42 is a bracket, 43 is a bearing which holds the rotor axis 32 rotatably.

Now, the operation of the present pulse motor is explained below.

Figure 5:
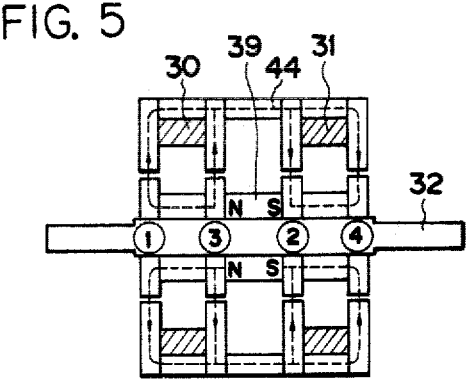

(a) When no electric current flows in the windings 30 and 31, the magnetic flux generated by the permanent magnet 39 is shown by the dotted line 44 in FIG. 5, and the rotor assembly 32 through 39 is stopped. It should be noted that the reference numerals (1), (2), (3) and (4) correspond to the first, second, third and fourth rotors, respectively.

Figure 6:
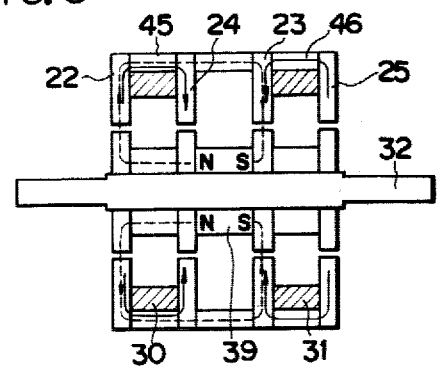

(b) When the first winding 30 is energized so that the magnetic flux shown by the solid line in FIG. 6 is generated, and the second winding 31 is energized so that the magnetic flux of the solid line 46 is generated, then, the flux in the third stator 24 and the fourth stator 25 is eliminated since the magnetic flux generated by the permanent magnet 39 is cancelled by the magnetic flux generated by the windings in those stators. Thus, the magnetic flux of the permanent magnet 39 remains only in the first stator 22 and the second stator 23, then the rotor axis rotates by an angle of ¼ pitch.

Figure 7:
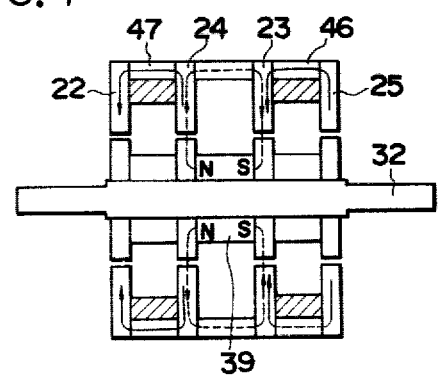

(c) When the first winding 30 is energized so that the magnetic flux of the solid line 47 in FIG. 7 is generated, and the second winding 31 is energized so that the magnetic flux 46 is generated, then, the magnetic flux in the first stator 22 and the fourth stator 25 is eliminated, since the magnetic flux in those stators is cancelled by the magnetic flux of the permanent magnet 39 and the current in the windings. Then, the magnetic flux of the permanent magnet 39 remains only in the second stator 23 and the third stator 24, and then the rotor axis 32 rotates by the predetermined angle ¼ pitch from the angular position of FIG. 6. It should by noted that the rotation by ¼ pitch is, in the present embodiment, 11.25 degrees (=45/4), since there are eight magnetic poles in the present embodiment, and thus, the angle of pitch between each magnetic pole is 45 degrees (=360/8).

Figure 8:
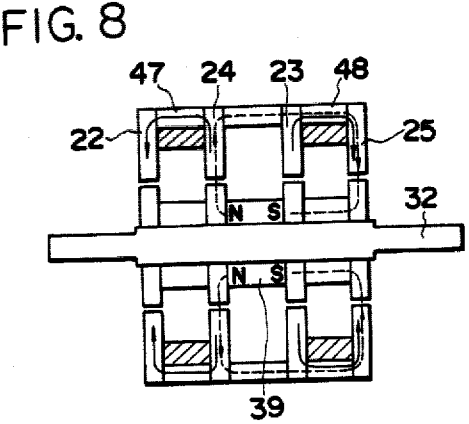

(d) Next, when the first winding 30 is energized so that the magnetic flux of the solid line 47 in FIG. 8 is generated, and the second winding 31 is energized so that the magnetic flux of the solid line 48 is generated, then, the magnetic flux in the first stator 22 and the second stator 23 is eliminated, since the magnetic flux in those stators is cancelled by the fluxes generated by the permanent magnet 39 and the windings 30 and 31. Then, the magnetic flux of the permanent magnet 39 remains only in the third stator 24 and the fourth stator 25, and then the rotor axis rotates by an angle of ¼ pitch from the angular position of FIG. 7.

Figure 9:
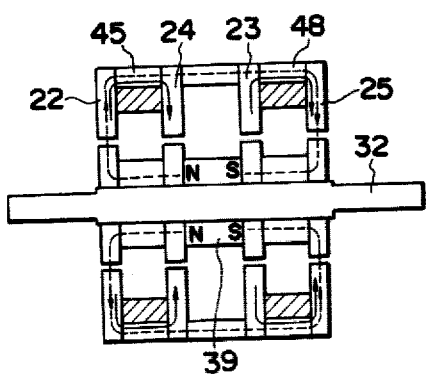

(e) Next, as shown in FIG. 9, when the first winding 30 is energized so that the magnetic flux 45 is generated, and the second winding 31 is energized so that the magnetic flux 48 is generated, then, the magnetic flux in the second stator 23 and the third stator 24 is eliminated. Then, the magnetic flux of the permanent magnet 39 remains only in the first stator 22 and the fourth stator 25, then the rotor axis 32 rotates by an angle of ¼ pitch.

Figure 10:
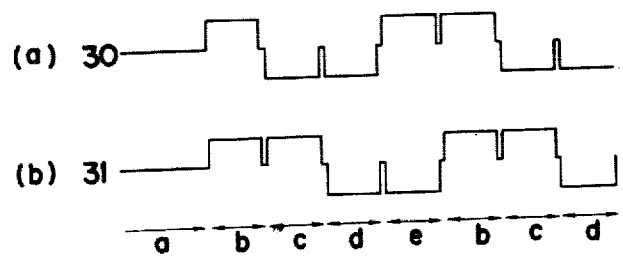
FIG. 10 is the diagram showing the waveform of the current for the pulse motor in FIG. 3.

By repeating the above operations (b) through (e), the pulse motor rotates continuously. FIG. 10 shows the time sequence of the electrical current in the two windings for continuous rotation. In FIG. 10, the curve (a) shows the waveform in the first winding 30, and the curve (b) shows the waveform in the second winding 31, and the symbols a,b,c,d,e, correspond to the operation modes explained above. Further, it is assumed in FIG. 10 that a positive current in the windings generates magnetic flux in the direction shown by the solid line 45 or 46 in FIG. 6.

As mentioned above, the pulse motor disclosed in FIGS. 3 and 4 has the advantages that the number of windings is reduced, the structure of the windings is simplified, the assembly work of the pulse motor is simplified, and insulation of the windings can be securely maintained.

Some modifications of the pulse motor in FIGS. 3 and 4 are of course possible. For instance, each winding 30 and 31 can be divided into pairs of windings, in which the positive and negative currents are applied to the separate windings, instead of changing the direction of the electrical current in a single winding.

Further, the magnetic poles of the stators can be shifted by ¼ pitch for each stators, instead of shifting the rotors by ¼ pitch.

Figure 11:
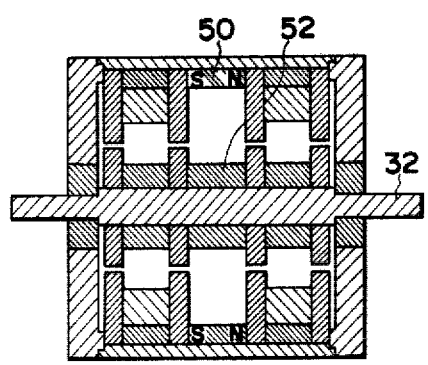
FIG. 11 is the structure of another embodiment of the pulse motor according to the present invention.

FIG. 11 shows another embodiment of the present pulse motor, in which a cylindrical permanent magnet 50 is mounted instead of the yoke 28 in FIG. 3, and the yoke 52 of soft magnetic material is provided instead of the permanent magnet 39 in FIG. 3. The operation of the pulse motor in FIG. 11 is the same as that in FIG. 3.

Figure 12:
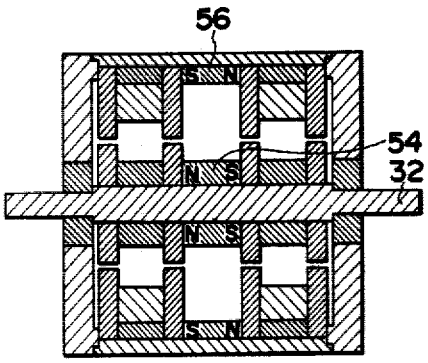
FIG. 12 is the structure of another embodiment of the pulse motor according to the present invention.

FIG. 12 shows still another embodiment of the present pulse motor, in which the permanent magnet 39 in FIG. 3 is divided into a pair of cylindrical permanent magnets 54 and 56, and the former is mounted in the rotor assembly and the latter is mounted in the stator assembly. The polarity of the permanent magnets 54 and 56 in FIG. 12 is so defined that those magnets are serially connected through yokes and magnetic poles. The operation of the pulse motor in FIG. 12 is similar to that in FIG. 3, and further, the pulse motor in FIG. 12 has the advantage that the length of the permanent magnets 54 and 56 can be shortened. The length of those magnets can be reduced to 50% of those of FIG. 3 or FIG. 11, since magnetic sources are serially connected on the condition that those permanent magnets have the same characteristic and the same cross sectional area. The shorter length of permanent magnets permits shorting of the pulse motor itself.

Figure 13:
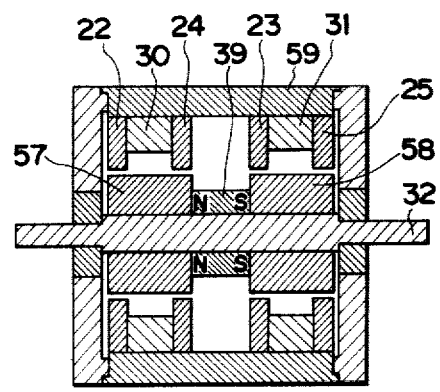
FIG. 13 is the structure of still another embodiment of the pulse motor according to the present invention.

FIG. 13 shows still another embodiment of the pulse motor according to the present invention, in which the rotor assembly comprises a pair of rotors 57 and 58, the permanent magnet 39, and the rotor axis 32. The rotor 57 replaces the first rotor, the third rotor and the yoke between them in FIG. 3, and the rotor 58 replaces the second rotor, the fourth rotor and the yoke between them. The yokes 27, 28 and 29 in the stator assembly in FIG. 3 are omitted, and instead a cylindrical housing 59 of ferromagnetic material is provided. It should be appreciated in FIG. 13 that the angular position of the magnetic poles of the stators 22 through 25 must be shifted by ¼ pitch for each stator. In FIG. 13, the yokes are omitted by improving the shape of the rotor assembly and the stator assembly, thus, the number of components of the pulse motor is reduced, then, the assembling steps can also be reduced.

Figure 14:
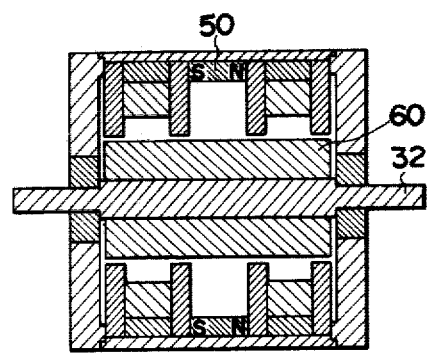
FIG. 14 is the structure of still another embodiment of the pulse motor according to the present invention.

FIG. 14 shows still another embodiment of the pulse motor according to the present invention, in which a bulk rotor 60 is provided instead of four rotors in FIG. 3. In this case, the permanent magnet 50 is mounted in the stator assembly, and the magnetic poles of the stators are shifted by ¼ pitch for each stator. Further, it should be appreciated that the bulk rotor 60 and the rotor axis 32 can be unified.

In the above embodiments, when a permanent magnet is secured in the rotor assembly, it is preferable to construct the rotor axis of non-magnetic material.

As explained above in detail, the present pulse motor has the advantages that a permanent magnet can be secured either in a rotor assembly or in a stator assembly, the number of windings is reduced, the assembly work of the windings is simple, the assembling steps of the motor is simplified, insulation of the windings is not required for assembly.

From the foregoing it will now be apparent that a new and improved pulse motor has been found. It should be understood of course that the embodiments disclosed are merely illustrative and are not intended to limit the scope of the invention. Reference should be made to the appended claims, therefore, rather than the specification as indicating the scope of the invention.

What is claimed is:
1. A pulse motor comprising:
   (a) a stator assembly comprising a cylindrical housing, first, second, third and fourth ring shaped stators with gaps therebetween, secured in said housing, a pair of windings secured between the first and the third stators and between the second and the fourth stators respectively, the axis of said windings being identical or parallel to the axis of the pulse motor itself, each of said stators having a plurality of magnetic poles in the inner surface of the ring shaped stator, the angular duration of each magnetic pole of each stator being of uniform pitch,
   (b) a rotor assembly rotatably inserted in said stator assembly, said rotor assembly comprising a rotor axis, at least two rotors fixed on said rotor axis, said rotors being positioned opposite said stators, each of said rotors having a plurality of magnetic poles on the outer surface thereof, and one permanent magnet fixed on said rotor axis between said rotors and positioned in the axial direction of said rotor axis between said third and second stators such that said permanent magnet is not opposite either of said stators and wherein the magnetic flux generated by said permanent magnet is in the axial direction.

2. A pulse motor as set forth in claim 1 wherein each stator is positioned such that the magnetic poles thereof have an angular relationship of ¼ pitch for each stator, and wherein the at least two rotors are a pair of circular rotors with the magnetic poles of the rotors confronting the magnetic poles of the stator and the number of magnetic poles of each rotor is the same as the number of magnetic poles for each stator.

3. A pulse motor as set forth in claim 2 wherein the housing of the stator assembly is a ferromagnetic material.

4. A pulse motor as set forth in claim 2 including a cylindrical yoke of ferromagnetic material inserted between said second and third stators.

* * * * *